(12) United States Patent
Sullivan et al.

(10) Patent No.: US 11,361,331 B2
(45) Date of Patent: Jun. 14, 2022

(54) SYSTEM, METHOD AND COMPUTER PROGRAM PRODUCT FOR PREDICTING A NEXT HOP IN A SEARCH PATH

(71) Applicant: TrueCar, Inc., Santa Monica, CA (US)

(72) Inventors: Thomas J. Sullivan, Santa Monica, CA (US); Michael D. Swinson, Santa Monica, CA (US)

(73) Assignee: TrueCar, Inc., Santa Monica, CA (US)

( * ) Notice: Subject to any disclaimer, the term of this patent is extended or adjusted under 35 U.S.C. 154(b) by 91 days.

(21) Appl. No.: 16/240,339

(22) Filed: Jan. 4, 2019

(65) Prior Publication Data

US 2019/0156354 A1 May 23, 2019

Related U.S. Application Data

(63) Continuation of application No. 15/297,883, filed on Oct. 19, 2016, now Pat. No. 10,210,534, which is a
(Continued)

(51) Int. Cl.
*G06Q 30/02* (2012.01)
*G06F 16/9535* (2019.01)
*G06F 16/2457* (2019.01)
*G06N 5/04* (2006.01)
*G06F 3/0484* (2022.01)
*G06F 3/0482* (2013.01)
*G06F 3/04842* (2022.01)

(52) U.S. Cl.
CPC ... *G06Q 30/0201* (2013.01); *G06F 16/24578* (2019.01); *G06F 16/9535* (2019.01); *G06N 5/04* (2013.01); *G06Q 30/0202* (2013.01); *G06F 3/0482* (2013.01); *G06F 3/04842* (2013.01)

(58) Field of Classification Search
CPC ............... G06F 16/24578; G06F 17/18; G06F 16/9535; G06F 3/0482; G06F 3/04842; G06Q 30/0631; G06Q 30/0201; G06Q 30/0202; G06N 5/04
See application file for complete search history.

(56) References Cited

U.S. PATENT DOCUMENTS 5,774,873 A 6/1998 Berent et al.
6,006,201 A 12/1999 Berent et al.
(Continued)

OTHER PUBLICATIONS

Paul Bertens et al.; A Machine-Learning Item Recommendation System for Video Games; IEEE; 4 pages; retrieved on Nov. 18, 2021 (Year: 2018).*
(Continued)

*Primary Examiner* — S. Sough
*Assistant Examiner* — Cuong V Luu
(74) *Attorney, Agent, or Firm* — Sprinkle IP Law Group (57) ABSTRACT

Systems, methods, and computer program products for identifying items more likely to be selected by an individual user as a next hop in a search path. Probability metrics are maintained for items, the probability metrics indicating frequencies with which users have selected each item as a next hop after viewing another item. Responsive to the user viewing a baseline item, a probability of selection as a next hop is determined for each of a plurality of items based on the probability metrics. The items are ranked according to the probabilities of selection and presented to the user.

18 Claims, 3 Drawing Sheets

Related U.S. Application Data continuation of application No. 14/152,884, filed on Jan. 10, 2014, now Pat. No. 9,508,084, which is a continuation of application No. 13/173,332, filed on Jun. 30, 2011, now Pat. No. 8,661,403.

(56) References Cited

U.S. PATENT DOCUMENTS

| | | | |
|---|---|---|---|
| 6,012,051 A | 1/2000 | Sammon, Jr. et al. | |
| 6,412,012 B1 | 6/2002 | Bieganski et al. | |
| 6,636,836 B1* | 10/2003 | Pyo | G06Q 30/02 705/26.41 |
| 6,684,208 B2 | 1/2004 | Kil et al. | |
| 7,050,982 B2 | 5/2006 | Sheinson | |
| 7,219,080 B1 | 5/2007 | Wagoner et al. | |
| 7,424,439 B1 | 9/2008 | Fayyad et al. | |
| 7,624,065 B2 | 11/2009 | Schoen et al. | |
| 7,665,083 B2 | 2/2010 | Demant et al. | |
| 7,685,021 B2 | 3/2010 | Kumar et al. | |
| 7,823,207 B2 | 10/2010 | Evenhaim | |
| 7,827,122 B1 | 11/2010 | Campbell | |
| 7,835,982 B2 | 11/2010 | Schoen et al. | |
| 7,921,052 B2 | 4/2011 | Dabney et al. | |
| 7,996,255 B1 | 8/2011 | Shenoy et al. | |
| 8,078,452 B2 | 12/2011 | Deane | |
| 8,112,325 B2 | 2/2012 | Foy et al. | |
| 8,126,881 B1 | 2/2012 | Sethi et al. | |
| 8,145,512 B1 | 3/2012 | Henne | |
| 8,200,514 B1 | 6/2012 | Crean et al. | |
| 8,230,362 B2 | 7/2012 | Couch | |
| 8,326,658 B1 | 12/2012 | Lee | |
| 8,326,845 B2 | 12/2012 | Sethi et al. | |
| 8,364,664 B2 | 1/2013 | Bennett | |
| 8,375,037 B2 | 2/2013 | Sethi et al. | |
| 8,521,619 B2 | 8/2013 | Perry, III et al. | |
| 8,538,828 B2 | 9/2013 | Skutta | |
| 8,589,212 B2 | 11/2013 | Pollak et al. | |
| 8,595,082 B2 | 11/2013 | Skutta | |
| 8,661,403 B2 | 2/2014 | Sullivan et al. | |
| 8,688,732 B1 | 4/2014 | Rajyaguru et al. | |
| 8,818,881 B2 | 8/2014 | Himmerick et al. | |
| 8,868,572 B2 | 10/2014 | Sethi et al. | |
| 9,103,743 B2 | 8/2015 | Couch | |
| 9,104,718 B1 | 8/2015 | Levy et al. | |
| 9,189,960 B2 | 11/2015 | Couch et al. | |
| 9,324,104 B1 | 4/2016 | Levy et al. | |
| 9,347,758 B2 | 5/2016 | Berent et al. | |
| D765,089 S | 8/2016 | Agee | |
| 9,412,203 B1 | 8/2016 | Garcia, III et al. | |
| 9,465,873 B1 | 10/2016 | Franke et al. | |
| 9,466,079 B2 | 10/2016 | Hygema et al. | |
| 9,508,084 B2 | 11/2016 | Sullivan et al. | |
| D774,523 S | 12/2016 | Agee | |
| D774,524 S | 12/2016 | Agee | |
| 9,600,822 B2 | 3/2017 | Pyle et al. | |
| 9,846,885 B1 | 12/2017 | Sarshar | |
| 10,210,534 B2 | 2/2019 | Sullivan et al. | |
| 2001/0021914 A1* | 9/2001 | Jacobi | G06Q 30/02 705/14.53 |
| 2002/0010625 A1* | 1/2002 | Smith | G06Q 30/0631 705/14.52 |
| 2004/0015466 A1 | 1/2004 | Okada | |
| 2004/0083452 A1 | 4/2004 | Minor | |
| 2004/0249867 A1 | 12/2004 | Kraiss | |
| 2005/0071251 A1 | 3/2005 | Linden | |
| 2005/0108677 A1 | 5/2005 | Jain et al. | |
| 2005/0222981 A1 | 10/2005 | Lawrence et al. | |
| 2005/0229167 A1 | 10/2005 | Henning et al. | |
| 2006/0010029 A1 | 1/2006 | Gross | |
| 2006/0129423 A1 | 6/2006 | Sheinson et al. | |
| 2006/0178973 A1 | 8/2006 | Chiovari et al. | |
| 2006/0190225 A1 | 8/2006 | Brand | |
| 2007/0094067 A1 | 4/2007 | Kumar et al. | |
| 2007/0185777 A1 | 8/2007 | Pyle et al. | |
| 2008/0243632 A1* | 10/2008 | Kane | G06Q 30/02 705/14.66 |
| 2008/0250312 A1* | 10/2008 | Curtis | G06Q 10/00 715/700 |
| 2009/0006118 A1 | 1/2009 | Pollak | |
| 2010/0070382 A1 | 3/2010 | Inghelbrecht et al. | |
| 2010/0088158 A1 | 4/2010 | Pollak | |
| 2010/0125570 A1 | 5/2010 | Chapelle et al. | |
| 2010/0161408 A1 | 6/2010 | Karson et al. | |
| 2010/0211558 A1 | 8/2010 | Bonabeau et al. | |
| 2010/0250336 A1 | 9/2010 | Selinger et al. | |
| 2010/0250511 A1 | 9/2010 | Wurzer | |
| 2010/0274571 A1 | 10/2010 | Mcfall et al. | |
| 2010/0274631 A1 | 10/2010 | Mcfall et al. | |
| 2010/0306192 A1 | 12/2010 | Kapur et al. | |
| 2011/0010323 A1* | 1/2011 | Wang | G06F 9/451 706/46 |
| 2011/0055196 A1 | 3/2011 | Sundelin et al. | |
| 2011/0055264 A1 | 3/2011 | Sundelin et al. | |
| 2011/0103482 A1* | 5/2011 | Lee | H04N 19/56 375/240.16 |
| 2011/0125850 A1 | 5/2011 | Rahnama et al. | |
| 2011/0131652 A1 | 6/2011 | Robinson et al. | |
| 2011/0202423 A1 | 8/2011 | Pratt et al. | |
| 2011/0202471 A1 | 8/2011 | Scott et al. | |
| 2012/0005070 A1 | 1/2012 | Mcfall et al. | |
| 2012/0016772 A1* | 1/2012 | Sadagopan | G06F 16/3331 705/27.1 |
| 2012/0185330 A1 | 7/2012 | Kleinrock | |
| 2012/0209831 A1 | 8/2012 | Rehman | |
| 2012/0233014 A1 | 9/2012 | Banks et al. | |
| 2012/0284087 A1 | 11/2012 | Pollak | |
| 2012/0284113 A1 | 11/2012 | Pollak | |
| 2012/0310771 A1 | 12/2012 | Selinger et al. | |
| 2013/0103692 A1 | 4/2013 | Raza et al. | |
| 2013/0191247 A1 | 7/2013 | Huang et al. | |
| 2013/0262086 A1 | 10/2013 | Kim et al. | |
| 2013/0339173 A1 | 12/2013 | Skutta | |
| 2014/0032352 A1 | 1/2014 | Fraser et al. | |
| 2014/0032353 A1 | 1/2014 | Fraser et al. | |
| 2014/0245305 A1 | 2/2014 | Miles et al. | |
| 2014/0067615 A1 | 3/2014 | Park et al. | |
| 2014/0089208 A1 | 3/2014 | Humble et al. | |
| 2014/0114758 A1 | 4/2014 | Bentley | |
| 2014/0135962 A1 | 5/2014 | King et al. | |
| 2014/0229391 A1 | 8/2014 | East, III et al. | |
| 2014/0257934 A1 | 9/2014 | Chrzan et al. | |
| 2014/0258044 A1 | 9/2014 | Chrzan et al. | |
| 2014/0278806 A1 | 9/2014 | Duguid et al. | |
| 2014/0279020 A1 | 9/2014 | Duguid et al. | |
| 2014/0279171 A1 | 9/2014 | Burgiss et al. | |
| 2014/0279229 A1 | 9/2014 | Burgiss et al. | |
| 2014/0279263 A1 | 9/2014 | Liu et al. | |
| 2014/0279275 A1 | 9/2014 | Burgiss et al. | |
| 2014/0297476 A1 | 10/2014 | Wang | |
| 2014/0351074 A1 | 11/2014 | Enge et al. | |
| 2015/0058152 A1 | 2/2015 | Pollak et al. | |
| 2015/0206206 A1 | 7/2015 | Puente et al. | |
| 2015/0220876 A1 | 8/2015 | Sethi et al. | |
| 2015/0253351 A1 | 9/2015 | Sadasivam et al. | |
| 2015/0324737 A1 | 11/2015 | Chrzan et al. | |
| 2015/0324879 A1 | 11/2015 | Lu et al. | |
| 2015/0356672 A1 | 12/2015 | Humble et al. | |
| 2015/0363865 A1 | 12/2015 | Ramanuja et al. | |
| 2016/0343058 A1 | 11/2016 | Levy et al. | |
| 2016/0364783 A1 | 12/2016 | Ramanuja et al. | |
| 2016/0371323 A1 | 12/2016 | Garcia, III et al. | |
| 2017/0039580 A1 | 2/2017 | Sullivan et al. | |

OTHER PUBLICATIONS

Cesare Bernardis et al.; Estimating Confidence of Individual User Predictions in Item-based Recommender Systems; ACM; pp. 149-156; retrieved on Nov. 18, 2021 (Year: 2019).*

International Search Report and Written Opinion for PCT Application No. PCT/US2012/044135, dated Sep. 10, 2012, 7 pages.

Office Action for U.S. Appl. No. 13/173,332, dated Jun. 7, 2013, 23 pages.

(56) References Cited

OTHER PUBLICATIONS

Beeferman, Doug et al., "Agglomerative Clustering of a Search Engine Query Log," 2000, ACM, pp. 407-416, at <http://dl.acm.org/citation.cfm?id=347176>.

Granka, Laura A. et al., "Eye-Tracking Analysis of User Behavior in WWW Search," Jul. 25-29, 2004, ACM, pp. 478-479, at <http://dl.acm.org/citation.cfm?id=1009079>.

Xue, Gui-Rong et al., "Optimizing Web Search Using Web Click-through Data*," Nov. 8-13, 2004, ACM, pp. 118-126, at <http://dl.acm.org/citation.cfm?id=1031192>.

Kosala, Raymond et al., "Web Mining Research: A Survey," 2000, ACM, vol. 2, Issue 1, pp. 1-15, at <http://dl.acm.org/citation.cfm?id=360406>.

Agichtein, Eugene et al., "Learning User Interaction Models for Predicting Web Search Results Preferences," Aug. 6-11, 2006, ACM, pp. 3-10, at <http://dl.acm.org/citation.cfm?id=1148175>.

Marchionini, Gary, "Exploratory Search: From Finding to Understanding," Apr. 2006, Communications of the ACM, vol. 49, No. 4, pp. 41-46, at <http://dl.acm.org/citation.cfm?id=1121979+B2>.

International Preliminary Report on Patentability issued for PCT Application No. PCT/US2012/044135, dated Jan. 16, 2014, 6 pages.

International Search Report and Written Opinion issued for PCT Application No. PCT/US2014/017199, dated May 15, 2014, 9 pages.

Office Action for U.S. Appl. No. 14/152,884, dated Jul. 20, 2015, 29 pgs.

International Preliminary Report on Patentability issued for PCT Application No. PCT/US2014/17199, dated Sep. 15, 2015, 6 pages.

Office Action for U.S. Appl. No. 14/152,884, dated Nov. 18, 2015, 22 pgs.

Office Action for U.S. Appl. No. 14/152,884, dated Apr. 6, 2016, 14 pgs.

Office Action for U.S. Appl. No. 14/054,509, dated Jun. 14, 2016, 14 pgs.

Hall, Mark et al., The WEKA Data Mining Software an Update, 2009 ACM, pp. 10-18, «http://dl.acm.org/citation.cfm?id=1656278».

Agrawal, Rakesh et al., "Privacy-Preserving Data Mining," 2000 ACM, pp. 439-450, «http://dl.acm.org/citation.cfm?id=335438».

Srivastava, Jaideep et al., "Web Usage Mining Discovery and Applications of Usage Patterns from Web Data," 2000 SIGKDD, pp. 12-23, «http://dl.acm.org/citation.cfm?id=846188».

Chen, Ming-Syan et al., "Data Mining an Overview from a Database Perspective," 1996 IEEE, pp. 12-23, «http://ieeexplore.ieee.org/stamp/stamp.jsp?tp=&arnumber=553155».

Berkin, P., "A Survey of Clustering Data Mining Techniques," 2006 Springer, pp. 25-71, «http://link.springer.com/chapter/10.1007/3-540-28349-8_2».

Keim, Daniel A., "Information Visualization and Visual Data Mining," 2002 IEEE, 8 pgs., «http://ieeexplore.ieee.org/stamp/stamp.jsp?tp=&arnumber=981847>.

Office Action issued for U.S. Appl. No. 14/054,509, dated Dec. 13, 2016, 20 pgs.

Office Action issued for U.S. Appl. No. 14/736,932, dated Jul. 13, 2017, 16 pgs.

Office Action issued for U.S. Appl. No. 14/736,932, dated Jan. 10, 2018, 21 pgs.

Office Action issued for U.S. Appl. No. 15/248,213, dated Mar. 7, 2018, 20 pgs.

Office Action issued for U.S. Appl. No. 15/297,883, dated Apr. 23, 2018, 30 pgs.

Office Action issued for U.S. Appl. No. 14/736,932, dated Jun. 12, 2018, 20 pages.

Office Action for U.S. Appl. No. 15/248,213, dated Aug. 29, 2018, 20 pgs.

Notice of Allowance for U.S. Appl. No. 15/297,883, dated Sep. 6, 2018, 10 pgs.

I-Cheng Yeh, et al., "The comparisons of data mining techniques for the predictive accuracy of probability of default credit card clients," Elsevier, 2007, pp. 2473-2480, retrieved from <https://www.sciencedirect.com/science/article/pii/S0957417407006719>.

Yijun Zhao, "Data Mining Techniques Review of Probability Theory," Northeastern University, 2015, 28 pgs., retrieved from <http://www.ccs.neu.edu/home/yzsun/classes/2015Fall_CS6220/Slides/prob-review.pdf>.

Xindong Wu et al, "Top 10 algorithms in data mining", Springer, 2007, 37 pgs., retrieved from <https://link.springer.com/article/10.1007/s10115-007-0114-2>.

R. Brause et al., Neural Data Mining for Credit Card Fraud Detection, IEEE, 1999, 4 pgs., retrieved from <https://ieeexplore.ieee.org/stamp/stamp.jsp?tp=&arnumber=809773>.

Hongyu Zhang et al., Comments on "Data Mining Static Code Attributes to Learn Defect Predictors", IEEE, 2007, pp. 635-636, retrieved from <https://ieeexplore.ieee.org/stamp/stamp.jsp?tp=&arnumber=4288196>.

Office Action for U.S. Appl. No. 14/736,932, dated Nov. 16, 2018, 14 pgs.

Ganter, Zeno et al., "Learning Attribute-to-Feature Mappings for Cold-Start Recommendations," 2010 IEEE International Conf. on Data Mining, Sydney, Australia, Dec. 13-17, 2010, pp. 176-185.

Notice of Allowance issued for U.S. Appl. No. 15/297,883, dated Dec. 10, 2018, 11 pages.

Usama Fayyad et al., "From Data Mining to Knowledge Discovery in Databases," AI Magazine, 1996, pp. 37-54.

Office Action issued for U.S. Appl. No. 14/736,932, dated Dec. 11, 2019, 10 pgs.

Office Action issued for U.S. Appl. No. 15/248,213, dated Jan. 8, 2020, 13 pgs.

Office Action issued for U.S. Appl. No. 14/736,932, dated Jul. 16, 2020, 10 pgs.

Office Action issued for U.S. Appl. No. 15/248,213, dated May 28, 2020, 11 pgs.

Office Action issued for U.S. Appl. No. 15/248,213, dated Oct. 29, 2020, 10 pgs.

Office Action issued for U.S. Appl. No. 14/736,932, dated Dec. 17, 2020, 10 pgs.

Office Action issued for U.S. Appl. No. 14/736,932, dated May 4, 2021, 10 pgs.

Office Action issued for U.S. Appl. No. 15/248,213, dated Mar. 23, 2021, 12 pgs.

Office Action issued for U.S. Appl. No. 14/736,932, dated Sep. 24, 2021, 10 pgs.

Office Action issued for U.S. Appl. No. 15/248,213, dated Aug. 12, 2021, 11 pgs.

Office Action issued for U.S. Appl. No. 15/248,213, dated Jan. 23, 2019, 21 pgs.

Office Action issued for U.S. Appl. No. 14/736,932, dated Apr. 30, 2019, 21 pgs.

* cited by examiner

SYSTEM, METHOD AND COMPUTER PROGRAM PRODUCT FOR PREDICTING A NEXT HOP IN A SEARCH PATH

CROSS REFERENCE TO RELATED APPLICATION(S)

This application is a continuation of, and claims a benefit of priority under 35 U.S.C. § 120 of the filing date of U.S. patent application Ser. No. 15/297,883, filed Oct. 19, 2016, issued as U.S. Pat. No. 10,210,534, entitled "SYSTEM, METHOD AND COMPUTER PROGRAM PRODUCT FOR PREDICTING ITEM PREFERENCE USING REVENUE-WEIGHTED COLLABORATIVE FILTER," which is a continuation of U.S. patent application Ser. No. 14/152,884, filed Jan. 10, 2014, issued as U.S. Pat. No. 9,508,084, entitled "SYSTEM, METHOD AND COMPUTER PROGRAM PRODUCT FOR PREDICTING ITEM PREFERENCE USING REVENUE-WEIGHTED COLLABORATIVE FILTER," which is a continuation of U.S. patent application Ser. No. 13/173,332, filed Jun. 30, 2011, issued as U.S. Pat. No. 8,661,403, entitled "SYSTEM, METHOD AND COMPUTER PROGRAM PRODUCT FOR PREDICTING ITEM PREFERENCE USING REVENUE-WEIGHTED COLLABORATIVE FILTER," which are fully incorporated by reference herein for all purposes.

TECHNICAL FIELD

This disclosure relates generally to collaborative filters used in a marketplace. More particularly, embodiments disclosed herein relate to a system, method, and computer program product embodying a collaborative filter for identifying certain consumer items.

BACKGROUND OF THE RELATED ART

Currently, collaborative filters exist to serve a marketplace where an item is relatively low-priced (e.g., packaged groceries), consumed frequently (e.g., movie rentals), bundled with other items (e.g., a consumer who buys a razor may also buy replacement blades), and/or there is little measurable similarity between items (e.g., books). When a consumer does not have information relevant to a specifically desired product or does not understand such information, the consumer can be at a serious negotiation disadvantage. Exacerbating this problem is the fact that complex, negotiated transactions can be difficult for consumers to understand due to a variety of factors, including interdependence between local demand and availability of products or product features, the point-in-time in the product lifecycle at which a transaction occurs, and the interrelationships of various transactions to one another. For example, a seller may sacrifice margin on one aspect of one transaction and recoup that margin from another transaction with the same (or a different) customer.

For items involving complex transactions, currently available data is generally single dimensional. To illustrate with a specific example, a recommended price (e.g., $20,000) for item A may not take into account how sensitive that price is ("Is $19,000 a good or bad price for this item?") or how item A compares to item B at about the same price. Consequently, there is always room for improvement.

SUMMARY OF THE DISCLOSURE

Embodiments disclosed herein provide a system, method, and computer program product for identifying consumer items more likely to be bought by an individual user. In some embodiments, a collaborative filter may be used to rank items based on the degree to which they match user preferences. The collaborative filter may be hierarchical and may take various factors into consideration. Example factors may include the similarity among items based on observable features, a summary of aggregate online search behavior across multiple users, the item features determined to be most important to the individual user, and a baseline item against which a conditional probability of another item being selected is measured. Example observable features may include, but are not limited to, price, color, size, etc.

In some embodiments, a method of identifying consumer items more likely to be purchased by an individual user may comprise determining a similarity among items based on observable features. In some embodiments, a collaborative filter disclosed herein may comprise a plurality of software components, including a first component for determining a similarity among items based on observable features. In some embodiments, the first component of the filter may be configured to compute individual feature difference between a first observation and a second observation, compute a composite similarity between the first observation and the second observation, and repeat these computations for all possible values of the first observation and the second observation.

In some embodiments, a method of identifying consumer items more likely to be purchased by an individual user may further comprise aggregating online search or item discovery behavior across multiple users. In some embodiments, a collaborative filter disclosed herein may further comprise a second component for aggregating online search behavior across multiple users. The second component of the filter may be implemented in various ways. For example, in one embodiment, the second component may be configured to collect item view frequencies only for each "hop" in a search path (a sequence of item discovery). In another embodiment, the second component may be configured to collect item view frequencies only for all "hops" in the search path. In yet another embodiment, the second component may be configured to collect item view frequencies only for all pairs of items in the search path, regardless of the order in which they were searched.

In some embodiments, a method of identifying consumer items more likely to be purchased by an individual user may further comprise determining item features that are most important to the individual user. It is possible that a new user will exhibit item discovery behavior that is distinctly different from other users. The filter disclosed herein may include a third component that can determine what features may be the most important to the individual user through the new user's item discovery behavior. In some embodiments, a weighting algorithm is utilized. When a user establishes he/her baseline item, the weights assigned to each feature are the same as those used to compute the similarity among items. The initial feature weights can be heuristically determined. After the first hop, when a user chooses the next item, the features in the baseline item and the next item are compared to determine how much they differ across multiple dimensions. This process can continue until the user's item discovery terminates.

Based on the single-hop search behavior, there can exist an implied pairing between two items for every observation in a historical item discovery log. When a user sets a baseline item, embodiments disclosed herein can operate to predict what his/her next move might be. In some embodiments, a method of predicting a user's item preference may comprise the following:

For each paired observation with a baseline item i, determine what the next selected item, j, is expected to be. Next, examine all other observations to determine what the next selected item, t, was for all cases where the baseline item is i.

For every case where the item selected after item i was t, compute a kernel $K(d_{it})$ for a given radius.

Determine a conditional probability that a user will select item j after i. This may reflect both structural, feature-based similarity weighted by the aggregate behavior, $q_{ij}(h)$. In one embodiment, its converse may be $d_{ij} = 1-s_{ij}$.

For each item, t, given a baseline item i, it may be possible to predict the item selected and compare to the actual next item selected and assign a penalty for incorrect predictions. Assuming a baseline of item i, and a predicted next item selection of j, and actual next item selection of k, then the penalty may be:

$$L_{j,k}(i)=0 \text{ if } j=k$$

$$L_{j,k}(i)=\max(R_k-R_j,0) \text{ if } j \neq k$$

In this example, $R_k$ may be the revenue that could be generated by selling one unit of item k.

For every observation in the historical data set, the penalty value may be computed and the sum of the penalties for incorrect predictions, L, can be totaled.

The prediction errors are driven by the weighted similarities, sij. Thus, changing the weights $w_p$ may change the value of L.

In one embodiment, the Epanechnikov kernel may be used with a radius of 0.5. Beginning with an initial weight of $w_p=1/m$ selected for $p=1, \ldots, m$ features, various sets of weights may be used to determine the set of weights that minimizes the total penalty, L.

M iterations can be run, each with a separate set of weights that represent a minor perturbation of the previous iteration's weights constrained so the condition that $\Sigma_{p=1}^{m} w_p = 1$ holds.

Software implementing embodiments disclosed herein may be implemented in suitable computer-executable instructions that may reside on one or more non-transitory computer-readable storage media. Within this disclosure, the term "computer-readable medium" encompasses all types of data storage medium that can be read by at least one processor. Examples of a computer-readable medium can include random access memories, read-only memories, hard drives, data cartridges, magnetic tapes, floppy diskettes, flash memory drives, optical data storage devices, compact-disc read-only memories, and other appropriate computer memories and data storage devices.

Embodiments of a collaborative filter disclosed herein can provide many advantages. For example, while conventional collaborative filters may be utilized in an electronic market to make suggestions on similar consumer goods, they are ineffective in making suggestions on alternatives. Embodiments of a collaborative filter disclosed herein can be particularly useful in identifying consumer items that are more lightly to be bought by an individual user, predicting the user's item preference and increasing the likelihood of the user actually making a purchase.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Figure 1:
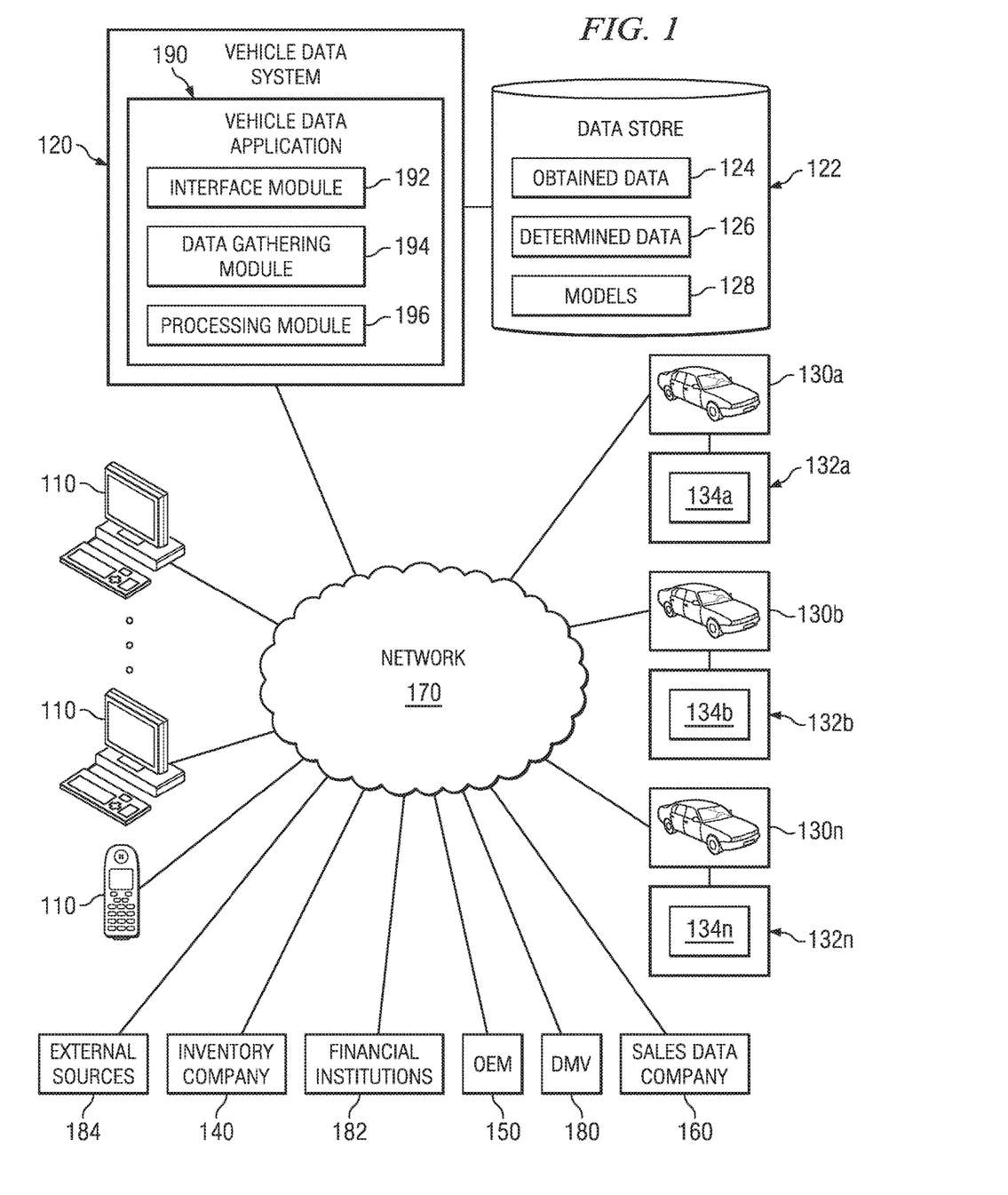
FIG. 1 depicts one embodiment of a topology including a vehicle data system.

Embodiments of the systems and methods disclosed herein may be better explained with reference to FIG. 1 which depicts one embodiment of a topology which may be used to implement embodiments of the systems and methods disclosed herein. Topology 100 comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments disclosed herein. These applications may include a vehicle data application 190 comprising one or more applications (instructions embodied on one or more non-transitory computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments disclosed herein or determined during the implementation of those embodiments.

Vehicle data system 120 may provide a wide degree of functionality including utilizing one or more interfaces 192 configured to for example, receive and respond to queries from users at computing devices 110; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122. A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110. More specifically, in one embodiment interfaces 192 may visually present the selected data set to the user in a highly intuitive and useful manner.

In particular, in one embodiment, a visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the user's understanding of the presented data, the interface may also present data related to incentives which were utilized to determine the presented data or how such incentives were applied to determine presented data.

Turning to the various other entities in topology 100, dealer 130 may be a retail outlet for vehicles manufactured by one or more of OEMs 150. To track or otherwise manage sales, finance, parts, service, inventory and back office administration needs dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" price (i.e., price with no negotiation) and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, AutoTrader.com, FordVehicles.com, etc.).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments disclosed herein, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments disclosed herein.

Figure 2:
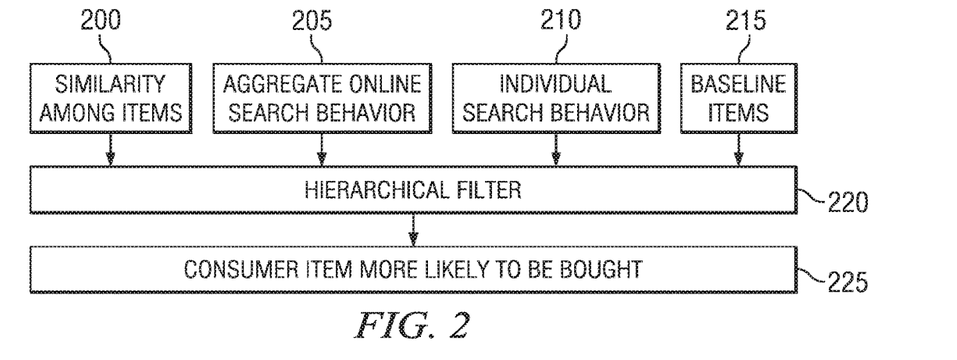
FIG. 2 depicts a flow diagram illustrating one example embodiment of a method for determining a consumer item most likely to be bought.

To identify consumer items more likely to be bought by an individual user, a filter may be used to rank items based on the degree to which they match user preferences. The filter may be hierarchical and may take various factors into account. As shown in FIG. 2, similarity among items 200, aggregate online search behavior 205, individual search behavior 210 and baseline items 215 may be accounted for in hierarchical filter 220. This may result in a consumer item more likely to be bought 225.

In one embodiment, the similarity among items 200 may be based on observable features.

Example observable features may include, but are not limited to, price, color, size, etc. A summary of aggregate online search behavior 205 can be across multiple users. Individual search behavior 210 may include the item features determined to be most important to the individual user. A baseline item 215 may include an item against which a conditional probability of another item being selected is measured.

One objective of the filter may be to determine the probability that a user will select item j given that he/she expressed interest in baseline item i:
P(j|i)=f(similarity among items, aggregate search behavior among items, individual search behavior).

Once the probabilities are determined for all pairs of items, they may be ranked in decreasing order. When a user selects item i during their item discovery session, the items with the highest ranking conditional probabilities may be suggested to the user as "you may also like these items". A filter that accurately predicts historical user preferences, without the "you may also like . . . " suggestions, can be leveraged to present items matching a user's preference during new item discovery sessions. It may also be used to present items with features that are both appealing to the user and may yield higher expected revenue for the seller.

Many existing collaborative filters exist to serve a marketplace where the consumer item is relatively low-priced, consumed frequently, bundled with other items, and/or there is little measurable similarity between items. Examples of consumer items that may be relatively low-price may include, but are not limited to, packaged groceries. Examples of consumer items that may be consumed frequently may include, but are not limited to, movie rentals. Examples of consumer items that may be bundled with other items may include, but are not limited to, a razor and replacement blades for the razor. Examples of consumer items that may have little measurable similarity between them may include, but are not limited to, books.

The filter presented herein differs from conventional collaborative filters in that it may be applied to consumer goods that are highly priced, bought infrequently as a standalone item and where structural differences are both observable and measurable. One example could be new or used automobiles; they are bought relatively infrequently (every few years or decades), highly priced (ranging in the tens of thousands of dollars), not bought in bulk, and the similarity across vehicles may be characterized by comparison of a relatively small set of features (year, make, model, body type, cylinders, fuel type, etc.). The new filter disclosed herein is not intended to answer the question: "Given a consumer bought an item, what else may he/she want to buy?". Rather, it may answer the question "Given a consumer is going to buy one-and-only-one item of a certain type, what candidate items should be suggested?". Thus, the focus can be on the decisions surrounding "item A OR item B" rather than "item A AND item B."

In some embodiments, the filter adopts the following notation:

An item ($x_i$) can be described by its p=1, . . . , m features which may also be known as characteristics or variables.

$$x_i = \{x_{i,1}, x_{i,2}, \ldots, x_{i,m}\}$$

All n distinct items may be represented in matrix form as $$X = \begin{bmatrix} x_{1,1} & x_{1,2} & \cdots & x_{1,m-1} & x_{1,m} \\ x_{2,1} & x_{2,2} & \cdots & x_{2,m-1} & x_{2,m} \\ \vdots & \vdots & \ddots & \vdots & \vdots \\ x_{n-1,1} & x_{n-1,2} & \cdots & x_{n-1,m-1} & x_{n-1,m} \\ x_{n,1} & x_{n,2} & \cdots & x_{n,m-1} & x_{n,m} \end{bmatrix}$$

Although the format of the data for some options may not be numeric, similarity can still be established across features by first transforming the data to a numeric scale.

Binary Features: In one embodiment, when a feature may assume only two possible states (e.g., yes/no, on/off, black/white, etc.), it can be fairly simple to map this feature onto a numeric scale by setting one state to 1 and the other to 0. For example, the following rule could be applied to transform a feature represented as "yes"/"no" onto a numeric scale.

if $x_{i,p}$="yes" then $x_{i,p}$=1 if $x_{i,p}$="no" then $x_{i,p}$=0.

The choice of which state gets assigned the value of 1 may not be important as it does not affect the similarity computations in the filter.

Ordinal Features: In one embodiment, when the values of a feature take on a non-numeric format with an implied order (e.g., "Low"/"Medium"/"High", "Poor"/"Fair"/"Good", etc.), a simple transformation may represent such features using their ranks. For example, the following rule could be applied to transform a feature represented as "low"/"medium"/"high" onto a numeric scale:

if $x_{i,p}$="low" then $x_{i,p}$=1 if $x_{i,p}$="medium" then $x_{i,p}$=2 if $x_{i,p}$="high" then $x_{i,p}$=3.

More complex transformations may be applied if information exists supporting the need to non-uniformly space the various states.

Categorical Features: In one embodiment, when the values of a feature take on a non-numeric format without an implied order (e.g., "Red"/"White"/"Green"), similarity for that feature across observations can be established. In one embodiment, this data can be left as-is until a later stage of the filter which is explained below. If there are only two states that the feature may assume, one could also just consider the feature to be binary.

For example, suppose the filter were to be applied to an automobile purchase in the "midsize car" category for which there were three vehicle types, each having four features {price, fuel efficiency, turbo, color} as shown in Table 1.

TABLE 1

Vehicle Feature Set

| Vehicle | Price (numeric) | Fuel Efficiency (Ordinal) | Turbo (Binary) | Color (Categorical) |
|---|---|---|---|---|
| 1 | $26,000 | Medium | Yes | Blue |
| 2 | $18,000 | Low | No | Red |
| 3 | $28,000 | High | Yes | Blue |

In this example, the transformation to the numeric scale (except the categorical features) could yield the results shown in Table 2.

TABLE 2

Numerically-scaled Vehicle Feature Set

| Vehicle | Price (numeric) | Fuel Efficiency (Ordinal) | Turbo (Binary) | Color (Categorical) |
|---|---|---|---|---|
| 1 | $26,000 | 2 | 1 | Blue |
| 2 | $18,000 | 1 | 0 | Red |
| 3 | $28,000 | 3 | 1 | Blue |

All features that have been transformed to a numeric format can then be represented on scale bounded over [0,1] as follows:

$$X_{i,p} = \frac{\left(x_{i,p} - \min_{i} x_{\cdot,p}\right)}{\left(\max_{i} x_{\cdot,p} - \min_{i} x_{\cdot,p}\right)}$$

The process of rescaling features onto a common scale is called "standardization." For example, suppose the filter is applied to an automobile purchase in the "midsize car" category and the least expensive car in the midsize car category was $18,000 and the most expensive car in the midsize car category was $28,000. The scaled values of the price feature for the least expensive, most expensive, and a car in the category costing $26,000 could be:

Least Expensive Car:$x_{i,p}$=(18,000−18,000)/(28,000−18,000)=0/10,000=0.0

Most Expensive Car:$x_{i,p}$=(28,000−18,000)/(28,000−18,000)=10,000/10,000=1.0

$26,000 Car:$x_{i,p}$=(26,000−18,000)/(28,000−18,000)=8,000/10,000=0.8

The standardized numeric representation of the features in this example is shown in Table 3.

TABLE 3

Standardized Numeric Vehicle Feature Set

| Vehicle | Price (numeric) | Fuel Efficiency (Ordinal) | Turbo (Binary) | Color (Categorical) |
|---|---|---|---|---|
| 1 | 0.8 | 0.5 | 1.0 | Blue |
| 2 | 0.0 | 0.0 | 0.0 | Red |
| 3 | 1.0 | 1.0 | 1.0 | Blue |

In some embodiments, a method of identifying consumer items more likely to be purchased by an individual user may comprise determining a similarity among items based on observable features. In one embodiment, a method of determining a similarity among items based on observable features may comprise a) computing individual feature difference between a first observation and a second observation; b) computing a composite similarity between the first observation and the second observation; and c) repeating steps a) and b) for all possible values of the first observation and the second observation.

In one embodiment, the similarity s between item i and item j based on a comparison of m observable features, $s_{ij}$, can be computed using the well-known Minkowski metric:

$$s_{ij} = 1 - \left[\sum_{p=1}^{m} w_p \cdot |x_{i,p} - x_{j,p}|^{\lambda}\right]^{1/\lambda}$$

where $\lambda \geq 0$, $0 \leq s_{ij} \leq 1$, and $\Sigma_{p=1}^{m} w_p = 1$. If the features are categorical (e.g., red/white/green), then $|x_{i,p} - x_{j,p}|$ if the categories match, 1 otherwise.

Figures 3, 4:
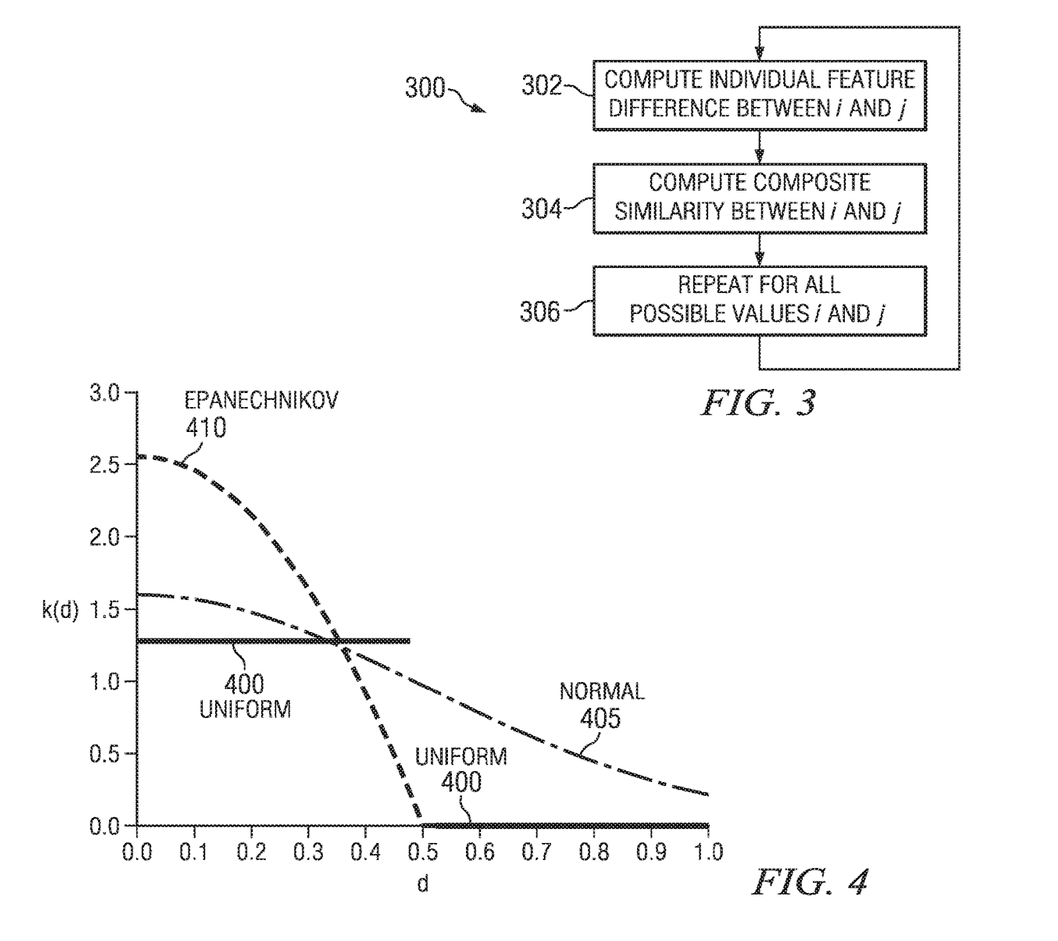
FIG. 3 depicts a flow diagram illustrating one example embodiment of a method for computing similarity between vehicles.
FIG. 4 depicts a graphical representation illustrating one example embodiment of possible kernels.

Referring to FIG. 3, at step 302, individual feature difference between observations i and j may be computed. Once individual feature differences between i and j have been computed, then at step 304 similarity between observations i and j may be computed. At step 306, steps 302 and 304 are repeated for all possible values of i and j. In some embodiments, it may not be necessary to compute the values of differences between an observation and itself, $d_{ii}$, since the similarity between an observation and itself is, by definition, 1.

As an example, to determine the similarity between vehicle 1 and vehicle 2 ($\lambda=2$), let $w_p=0.5$ for the price feature (p=1), 0.2 for the fuel efficiency feature (p=2), 0.1 for the turbo feature (p=3), and 0.3 for the color feature (p=4) and so $\Sigma_{p=1}^{m} w_p = 1$. The similarity between vehicle 1 and vehicle 2 may be determined using one embodiment of method 300 as follows:

Step 302: Compute individual feature difference between observations i and j:

Price: $|x_{i,1} - x_{j,1}| = |x_{1,price} - x_{2,price}| = |0.8 - 0.0| = 0.8$

Fuel Efficiency: $|x_{i,2} - x_{j,2}| = |x_{1,fuel.eff} - x_{2,fuel.eff}| = |0.5 - 0.0| = 0.5$ Turbo: $|x_{i,3} - x_{j,3}| = |x_{1,turbo} - x_{2,turbo}| = |1.0 - 0.0| = 1.0$ Color: $|x_{i,4} - x_{j,4}| = |x_{1,color} - x_{2,color}| = (blue \neq red) = 1.0$ Step 304: Compute a composite similarity between observations i and j:

$s_{ij} = 1 - [\Sigma_{p=1}^{m} w_p |x_{i,p} - x_{j,p}|^{\lambda}]^{1/\lambda} = 1 - [0.5 \times (0.8)^2 + 0.2 \times (0.5)^2 + 0.1 \times (1.0)^2 + 0.3 \times (1.0)^2]^{1/2} = 1 - (0.77)^{1/2} = 0.051$ Step 306: Repeat the above steps for all possible values of i and j. In this example, there is not a need to compute the values of $d_{ii}$ since by definition the similarity between an observation and itself is 1.

In some embodiments, a method of identifying consumer items more likely to be purchased by an individual user may further comprise generating a summary of aggregate online search behavior across multiple users, $q_{ij}(h)$. Online search behavior may be aggregated across multiple users in various ways.

When a user establishes an item discovery session, he/she may begin with a baseline item, i. In one embodiment, unless the session terminates without exploration of other items, a usage log containing the items viewed and the order in which they were viewed can be updated. If the log contains the usage history for many users, an aggregation of item view frequencies may become available and can be used to measure aggregate similarity across items. Unlike the feature-based similarity metric, $s_{ij}$, this metric may reflect historical search behavior. In some embodiments, from the log, the frequency of cases where users viewed item j after they viewed item i, $n_{ij}$, may be computed in a square matrix. Table 4 provides an example where there exists only 3 items: i, j, k.

TABLE 4

Aggregate Item Search Frequency Matrix

| Baseline item | Next Item Selected | | |
|---|---|---|---|
| | i | j | k |
| i | 0 | $n_{ij}$ | $n_{ik}$ |
| j | $n_{ji}$ | 0 | $n_{jk}$ |
| k | $n_{ki}$ | $n_{kj}$ | 0 |

When item discovery is limited to allow only one item to be viewed at a time, item view histories may be constrained. For example, if a user selects item i as a baseline and is interested in both items j and k, he/she may choose one or the other to view first. If the user wished to view all three items, and viewed j before k, there two possible sequences:

$i \rightarrow j, i \rightarrow k$ (after viewing j, the user went back to i then chose k)

$i \rightarrow j \rightarrow k$ (after viewing j, the user chose k)

This may lead to different embodiments of this component of the filter.

In one embodiment, frequencies may be collected only for each "hop" in the search path, and so the aggregate frequency may be $q_{ij}(1) = n_{ij}$. In the example provided, the first sequence of item discovery could increase the total value of $n_{ij}$ and $n_{ik}$ by 1 and $n_{jk}$ by 0. The second sequence of item discovery could increase the total value of $n_{ij}$ and $n_{jk}$ by 1 and $n_{ik}$ by 0.

In another embodiment, frequencies may be collected only for all h "hops" in the search path, and so the aggregate frequency could be $$q_{ij}(h) = \frac{2h}{h(h+1)} n_{i,r}$$

for all items $r \neq i$. In the example provided, the first sequence of item discovery may increase the total value of $n_{ij}$ and $n_{ik}$ by 1 and $n_{jk}$ by 0. The second sequence of item discovery, where h=2, may increase the total value of $n_{ij}$ and $n_{jk}$ by 1 and $n_{ik}$ by 2/3.

In yet another embodiment, frequencies may be collected only for all pairs of items in the search path, regardless of the order in which they were searched. This may be appealing when the user's item search histories are known, but the order in which they searched them was not. In the example provided, both the first and second sequences of item discovery may increase the total values of $n_{ij}$, $n_{ik}$ and $n_{jk}$ by 1.

In some embodiments, a method of identifying consumer items more likely to be purchased by an individual user may further comprise determining item features that are most important to an individual user, $u_{ij}(h)$. As discussed above, for any given item, there can be a multitude of observable and measurable features. While the first two components of the item similarity may reflect the aggregate user discovery behavior and structural differences among items, it is possible that a new user may exhibit item discovery behavior that is distinctly different from others. Initially, when a new user selects his or her baseline item i, there may be no information that will distinguish him/her from other users. However, once the next item is selected, additional information may become available that can be leveraged to provide more precise suggestions on other items that a user may like.

In the computation of the structural similarity among items based on features, the computation of $s_{ij}$ looked at the weighted difference in features and the weight assigned to feature p was denoted by $w_p$. The user-level component of the filter reflects adjustment to $s_{ij}$ based on the features determined, through the new user's item discovery behavior, to be most important: $u_{ij}(h)=s_{ij}+\delta_{ij}(h)$. This component may be computed in the following steps:

Step 1: When a user establishes his/her baseline item, i, the weights assigned to each feature, $w_p(h)=w_p(0)$ may be the same as those used to compute $s_{ij}$. How the initial values of the various $w_p$'s are heuristically determined are explained later in this application.

Step 2: After the first hop, when a user chooses the next item, j, the features in items i and j are compared to see how much they differ across the m dimensions. For dimension p, the difference may be $d_{ij}^{(p)}=|x_{i,p}-x_{j,p}|$ and so the weight $w_p(h)$ may be adjusted to be $w^*_p(h)=[1-|d_{ij}^{(p)}|] \times w_p(h-1)$. Once this is done for all features, p, the weights are rescaled so they sum to 1:

$$w_p^{**} = \frac{w_p^*}{\sum_{p=1}^{m} w_p^*}.$$

Step 3: After the user selects hop h, his/her user-level structural similarity may be computed as:

$$u_{ij}(h) = 1 - [\Sigma_{p=1}^{m} w^{**}_p(h)|x_{i,p}-x_{j,p}|^\lambda]^{1/\lambda}$$

In the earlier example, the original values of $w_p(0)$ for the price, fuel efficiency, turbo and color features were w={0.5, 0.2, 0.1, 0.3} respectively. If a particular user started his/her search with vehicle 1 and then went to vehicle 3 at hop h=1, then the revised weights before rescaling to sum to 1 may be:

Price(p=1):$w^*_1(1)=[1-|d_{ij}^{(1)}|] \times w_1(0)=[1-|0.2|] \times 0.5=0.4$

Fuel Efficiency(p=2):$w^*_2(1)=[1-|d_{ij}^{(2)}|] \times w_2(0)=[1-|0.5|] \times 0.2=0.10$ Turbo(p=3):$w^*_3(1)=[1-|d_{ij}^{(3)}|] \times w_3(0)=[1-|0|] \times 0.1=0.1$ Color(p=4):$w^*_4(1)=[1-|d_{ij}^{(4)}|] \times w_4(0)=[1-|0|] \times 0.3=0.3$ After standardizing so that the condition that the weights sum to 1, the revised feature weights may be: {0.4, 0.1, 0.1, 0.3}/(0.4+0.1+0.1+0.30)={0.44,0.11,0.11,0.34}.

Determination of the feature weights used to compute $s_{ij}$ and $u_{ij}(0)$ may be computed heuristically. The values of $w_p$ can reflect the relative importance of each feature in separating one item from another. Higher weights (closer to 1) may indicate the feature is more important in distinguishing items, and smaller weights (closer to 0) are less important. In this stage of the filter, we may heuristically determine the optimal weights.

For example, if we define $d_{ij}=1-s_{ij}$ as the dissimilarity between two items, then a kernel $K(d_{ij})$, can be defined for a given radius, $0 \leq r \leq 1$. Some examples of possible kernels are shown in FIG. 4 for r=0.5. The uniform kernel is $K(d_{ij})=1/\sqrt{2}$, if $d_{ij} \leq r$, 0 otherwise. Line 400 represents a uniform kernel. Line 405 represents a normal kernel. Line 410 represents an Epanechnikov kernel.

For every observation in the historical item discovery log, there can exist an implied pairing between two items, i and j, based on the single-hop search behavior. When a user sets a baseline item of i, one can predict what his/her next move will be: item j, item k, or some other item t. This prediction may be done as follows:

(A) For each paired observation with a baseline item i, determine what the next selected item, j, is expected to be. Next, examine all other observations to determine what the next selected item, t, was for all cases where the base item is i.

(B) For every case where the item selected after item i was t, compute the kernel $K(d_{it})$ (C) The conditional probability that a user will select item j after i may then be:

$$g_h(j \mid i) = \frac{K(d_{ij})q_{ij}(h)}{\sum_{t \neq i} K(d_{it})q_{it}(h)}$$

This may reflect both structural, feature-based similarity weighted by the aggregate behavior, $q_{ij}(h)$. In one embodiment, its converse may be $d_{ij}=1-s_{ij}$.

(D) For each item, t, selected given a baseline item i, it may be possible to predict the item selected and compare to the actual next item selected and assign a penalty for incorrect predictions. Assuming a baseline of item i, and a predicted next item selection of j, and actual next item selection of k, then the penalty may be:

$L_{j,k}=0$ if $j=k$ $L_{j,k}(i)=\max(R_k-R_j, 0)$ if $j \neq k$

In this example, $R_k$ may be the revenue that could be generated by selling one unit of item k.

(E) For every observation in the historical data set, the penalty value may be computed and the sum of the penalties for incorrect predictions, L, can be totaled.

(F) Since the prediction errors are driven by the weighted similarities, sij, changing the weights wp may change the value of L.

(G) In one embodiment, the Epanechnikov kernel may be used with a radius of 0.5.

Beginning with an initial weight of $w_p=1/m$ selected for p=1, . . . , m features, various sets of weights may be used to determine the set of weights that minimizes the total penalty, L.

(H) M iterations can be run, each with a separate set of weights that represent a minor perturbation of the previous iteration's weights constrained so the condition that $\Sigma_{p=1}^{m} w_p=1$ holds.

Figure 5:
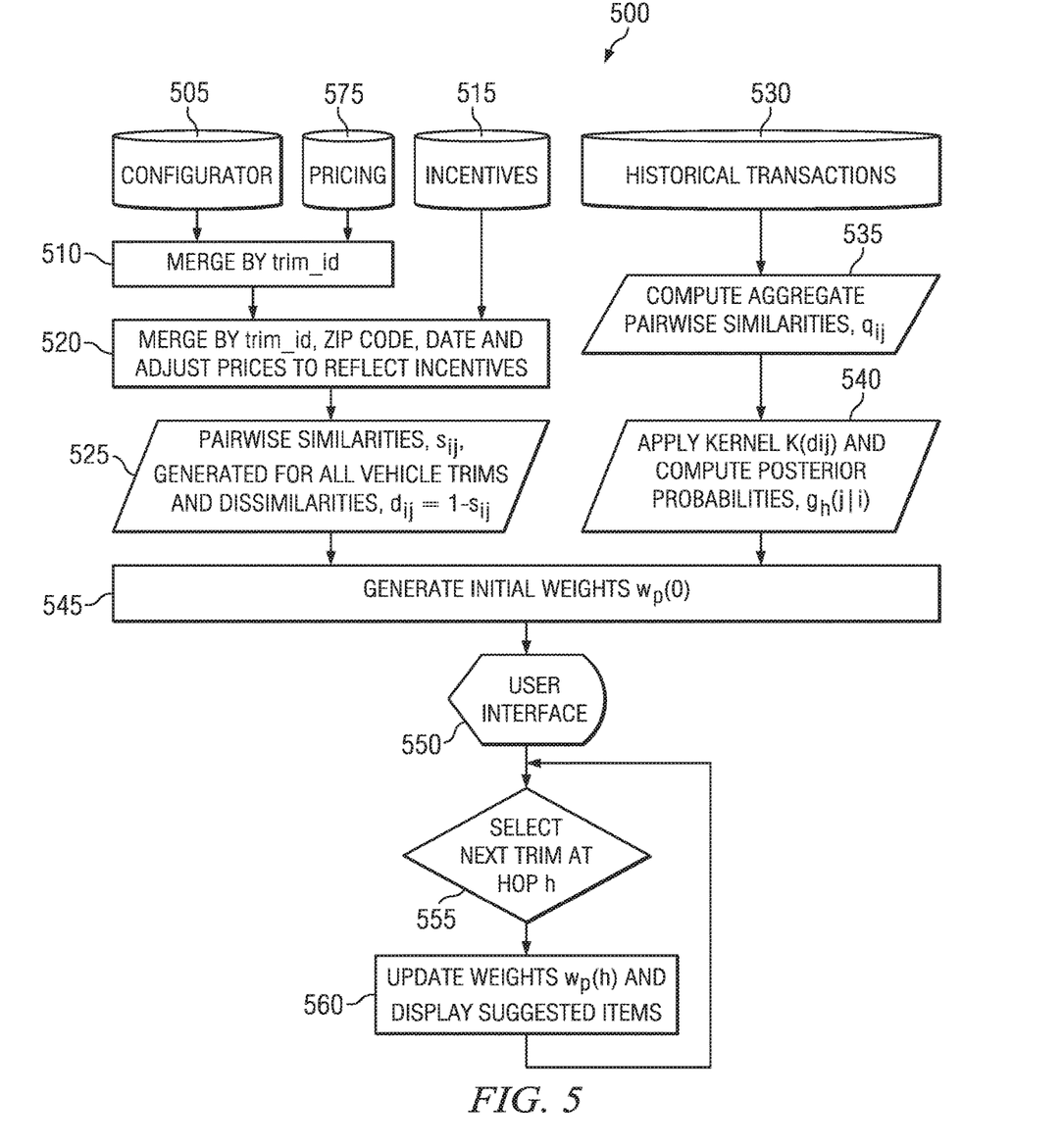
FIG. 5 depicts a diagram illustrating one example embodiment of a data flow in determining consumer items likely to be bought.

FIG. 5 depicts example data flow 500 implementing an embodiment of a hierarchical filter disclosed herein. Data flow 500 may utilize various types of data stored in one or more data sources 505, 515, 530, 575.

For example, configurator data 505 may contain features for each of the vehicle trims: year, make, model, body type, # cylinders, aspiration, # doors, gross vehicle weight, miles-per-gallon (highway and city), drive (4WD, AWD, 2WD), fuel type, and displacement. The unique key used for matching in this database may be the 'trim_id' at step 510.

Current pricing data 575 may be organized by ZIP Code and may include Base MSRP, configured MSRP, dealer invoice, dealer cost, price (unadjusted for incentives), etc. The pricing data may be an output of a statistical model that generates prices for each trim and ZIP code based on historical transactions data. The unique key used for matching in this database may be the 'trim_id' at step 510. A secondary key use for matching with the incentives data may be the 'ZIP Code.'

Incentives data 515 may include dealer and customer cash incentives by date, ZIP Code and vehicle trim. If an incentive is in place at the time of search for the vehicle trim and ZIP Code specified by the user, the incentives can be added to the pricing data and the price may be adjusted by the amount of the incentive based on match of 'trim_id' and 'ZIP Code' at step 520.

Historical transactions logs 530 may include unique visitor ID, time of visit, date of visit, ZIP Code, vehicle trims searched and order in which vehicle trims were searched.

Live visitor logs may be in place for those currently on the base website. Upon start of a session, the unique visitor ID, time of visit, date of visit, ZIP Code may be stored. At each subsequent hop, the vehicle trim being viewed can be stored in the order of visit. For each hop, the suggested vehicles selected by the algorithm to be most similar to the current view may be displayed and the trim-level ID is saved.

Attention may now be directed to additional example embodiments for usage of the hierarchical filter.

Example Embodiment 1: A generalized filter can be based on a combination of weighted feature similarities and historical aggregate user behavior using only one-hop behavior. This filter's weights may be optimized so that the expected loss in revenue due to inaccurate predictions is minimized. When a user visits the item discovery tool, the conditional probability of choosing item j after item i may be based on the first two components of the filter: the weighted feature-level similarity and the aggregate user behavior (using only the 1-hop data) data. The conditional probability of all other items, t, being selected given a baseline of item may be computed as: $P(j|i)=(1-\alpha)g_1(t|i)+(\alpha) u_{it}(1)$ where $\alpha=|\delta_{ij}(1)|=|s_{ij}-u_{ij}(1)|$ and may put emphasis on the user-level behavior proportional to the degree to which the user's behavior differs from the aggregate. After each selection (including the first) of an item, the conditional probabilities for all other items may be ranked and the top S (based on web page real estate available) can be displayed. Comparison of items is unrestricted. Every item pair i, j in the universe of items may be used in the computations of conditional probability.

Example Embodiment 2: A generalized filter can be based on a combination of weighted feature similarities and historical aggregate user behavior and may take into account all hops initiated by a user. This filter's weights may be optimized so that the expected loss in revenue due to inaccurate predictions is minimized. When a user visits the item discovery tool, the conditional probability of choosing item j after item i are based on the first two components of the filter: the weighted feature-level similarity and the aggregate user behavior (using all of the h-hop data) data. The conditional probability of all other items, t, being selected given a baseline of item may be computed as: $P(j|i)=(1-\alpha)g_h(t|i)+(\alpha) u_{it}(h)$ where $\alpha=|s_{ij}-u_{ij}(1)|$ and may put emphasis on the user-level behavior proportional to the degree to which the user's behavior differs from the aggregate. After each selection (including the first) of an item, the conditional probabilities for all other items may be ranked and the top S (based on web page real estate available) can be displayed. Comparison of items may be unrestricted. Every item pair i,j in the universe of items may be used in the computations of conditional probability.

Example Embodiment 3: A generalized filter can be based on a combination of weighted feature similarities and historical aggregate user behavior and takes into account all hops initiated by a user. This filter does not distinguish the order in which hops were executed. The filter's weights may be optimized so that the expected loss in revenue due to inaccurate predictions is minimized. When a user visits the item discovery tool, the conditional probability of choosing item j after item i may be based on the first two components of the filter: the weighted feature-level similarity and the aggregate user behavior (using all of the h-hop data) data. The conditional probability of all other items, t, being selected given a baseline of item may be computed as: $P(j|i)=(1-\alpha)g_h(t|i)+(\alpha) u_{it}(h)$ where $\alpha=|s_{ij}-u_{ij}(1)|$ and may put emphasis on the user-level behavior proportional to the degree to which the user's behavior differs from the aggregate. After each selection (including the first) of an item, the conditional probabilities for all other items can be ranked and the top S (based on web page real estate available) can be displayed. Comparison of items may be unrestricted. Every item pair i,j in the universe of items may be used in the computations of conditional probability.

Example Embodiment 4: This example embodiment is similar to Example Embodiment 1, with three exceptions. First, comparison of items may be restricted so that only item pairs i,j whose retail price is within 20% of each other are compared. Historical data used to compute aggregate level behavior may be geographically restricted. Rankings and display of "you may also like" may be restricted to only those items in the price band and are reflective historical data from the geographic area in which the new user is located.

Example Embodiment 5: This example embodiment is similar to Example Embodiment 2, with three exceptions. First, comparison of items can be restricted so that only item pairs i,j whose retail price is within 20% of each other are compared. Historical data used to compute aggregate level behavior may be geographically restricted. Rankings and display of "you may also like" may be restricted to only those items in the price band and are reflective historical data from the geographic area in which the new user is located.

Example Embodiment 6: This example embodiment is similar to Example Embodiment 3, with three exceptions. First, comparison of items may be restricted so that only item pairs i,j whose retail price is within 20% of each other are compared. Historical data used to compute aggregate level behavior may also be geographically restricted. Finally, rankings and display of "you may also like" can be restricted to only those items in the price band and are reflective historical data from the geographic area in which the new user is located.

Although this disclosure has been described with respect to specific embodiments, these embodiments are merely illustrative, and not restrictive of the invention disclosed herein. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for identifying consumer items more likely to be selected by a user as a next hop in a search path, comprising:
in a computer having a processor and a memory, wherein the computer is communicatively connected to a computing device;
generating an interface which is presented to the user via the computing device;
maintaining probability metrics corresponding to each pair of items in a plurality of items, the probability metrics indicating for each pair of items a corresponding frequency with which users have selected one of the pair of items as the next hop in the search path following viewing of another one of the pair of items, the search path comprising a sequence of items which are viewed by the user, the probability metrics representing historical online search behavior of a plurality of users;
determining, responsive to the user viewing a baseline item via the interface on the computing device, for each individual item of the plurality of items, a probability that the user will select the individual item as the next hop in the search path, wherein the probability is determined based on the probability metrics corresponding to the pair of items including the baseline item and the individual item;
ranking, in decreasing order, probabilities determined for the plurality of items, wherein items that are more frequently selected as the next hop in the search path are ranked higher than items that are less frequently selected as the next hop in the search path;
updating the interface running on the computing device, wherein the updated interface presents to the user at least a portion of the plurality of items ranked in decreasing order according to the probabilities; and
after and in response to the user selecting one of the presented portion of the plurality of items, ranking other ones of the portion of the plurality of items and updating the interface running on the computing device to present to the user the other ones of the portion of the plurality of items ranked in decreasing order according to the corresponding probabilities.

2. The method according to claim 1, further comprising collecting item view frequencies only for each hop by the user in a sequence of item discovery.

3. The method according to claim 1, further comprising collecting item view frequencies only for all hops by the user in a sequence of item discovery.

4. The method according to claim 1, further comprising collecting item view frequencies only for all pairs of items in a sequence of item discovery.

5. The method according to claim 1, further comprising:
for each paired observation associated with the baseline item, determining what a first next item is expected to be selected by the user; and
examining all observations associated with the baseline item to determine what a second next item is expected to be selected by the user.

6. The method according to claim 5, further comprising:
defining a kernel for a given radius each time the second next item is selected after the baseline item is established by the user.

7. The method according to claim 5, further comprising:
determining a conditional probability that the user will select a particular first next item after a particular baseline item is established by the user.

8. The method according to claim 5, further comprising:
making a prediction as to which next item the user will select;
comparing the prediction with an actual next item selected by the user; and
assigning a penalty value to the prediction if the prediction is incorrect.

9. The method according to claim 8, wherein the prediction is one of a plurality of predictions, further comprising:
determining a total penalty value for all incorrect predictions in the plurality of predictions; and
determining a set of weights that minimizes the total penalty.

10. A computer program product comprising at least one non-transitory computer readable medium storing instructions translatable by at least one processor in a computer having a memory, wherein the computer is communicatively connected to a computing device, wherein the instructions are translatable by the at least one processor to perform:
generating an interface which is presented to a user via the computing device;
maintaining probability metrics corresponding to each pair of items in a plurality of items, the probability metrics indicating for each pair of items a corresponding frequency with which users have selected one of the pair of items as a next hop in a search path following viewing of another one of the pair of items, the search path comprising a sequence of items which are viewed by the user, the probability metrics representing historical online search behavior of a plurality of users;
determining, responsive to the user viewing a baseline item via the interface on the computing device, for each individual item of the plurality of items, a probability that the user will select the individual item, wherein the probability is determined based on the probability metrics corresponding to the pair of items including the baseline item and the individual item;
ranking, in decreasing order, probabilities determined for the plurality of items, wherein items that are more frequently selected as the next hop in the search path are ranked higher than items that are less frequently selected as the next hop in the search path;
updating the interface running on the computing device, wherein the updated interface presents to the user at least a portion of the plurality of items ranked in decreasing order according to the probabilities; and
after and in response to the user selecting one of the presented portion of the plurality of items, ranking other ones of the portion of the plurality of items and updating the interface running on the computing device to present to the user the other ones of the portion of the plurality of items ranked in decreasing order according to the corresponding probabilities.

11. The computer program product of claim 10, wherein the at least one non-transitory computer readable medium further stores instructions translatable by the at least one processor to perform:
   collecting item view frequencies for each hop by the user in a sequence of item discovery.

12. The computer program product of claim 10, wherein the at least one non-transitory computer readable medium further stores instructions translatable by the at least one processor to perform:
   collecting item view frequencies for all hops by the user in a sequence of item discovery.

13. The computer program product of claim 10, wherein the at least one non-transitory computer readable medium further stores instructions translatable by the at least one processor to perform:
   collecting item view frequencies for all pairs of items in a sequence of item discovery.

14. The computer program product of claim 10, wherein the at least one non-transitory computer readable medium further stores instructions translatable by the at least one processor to perform:
   for each paired observation associated with the baseline item, determining what a first next item is expected to be selected by the user; and
   examining all observations associated with the baseline item to determine what a second next item is expected to be selected by the user.

15. The computer program product of claim 14, wherein the at least one non-transitory computer readable medium further stores instructions translatable by the at least one processor to perform:
   defining a kernel for a given radius each time the second next item is selected after the baseline item is established by the user.

16. The computer program product of claim 14, wherein the at least one non-transitory computer readable medium further stores instructions translatable by the at least one processor to perform:
   determining a conditional probability that the user will select a particular first next item after a particular baseline item is established by the user.

17. The computer program product of claim 14, wherein the at least one non-transitory computer readable medium further stores instructions translatable by the at least one processor to perform:
   making a prediction as to which next item the user will select;
   comparing the prediction with an actual next item selected by the user; and
   assigning a penalty value to the prediction if the prediction is incorrect.

18. The computer program product of claim 17, wherein the prediction is one of a plurality of predictions and wherein the at least one non-transitory computer readable medium further stores instructions translatable by the at least one processor to perform:
   determining a total penalty value for all incorrect predictions in the plurality of predictions; and
   determining a set of weights that minimizes the total penalty.

* * * * *